Feb. 23, 1954
J. J. SHAPIRO
2,669,863
APPARATUS FOR MEASURING THE MELTING
POINT OF FUSIBLE MATERIALS
Filed July 11, 1951
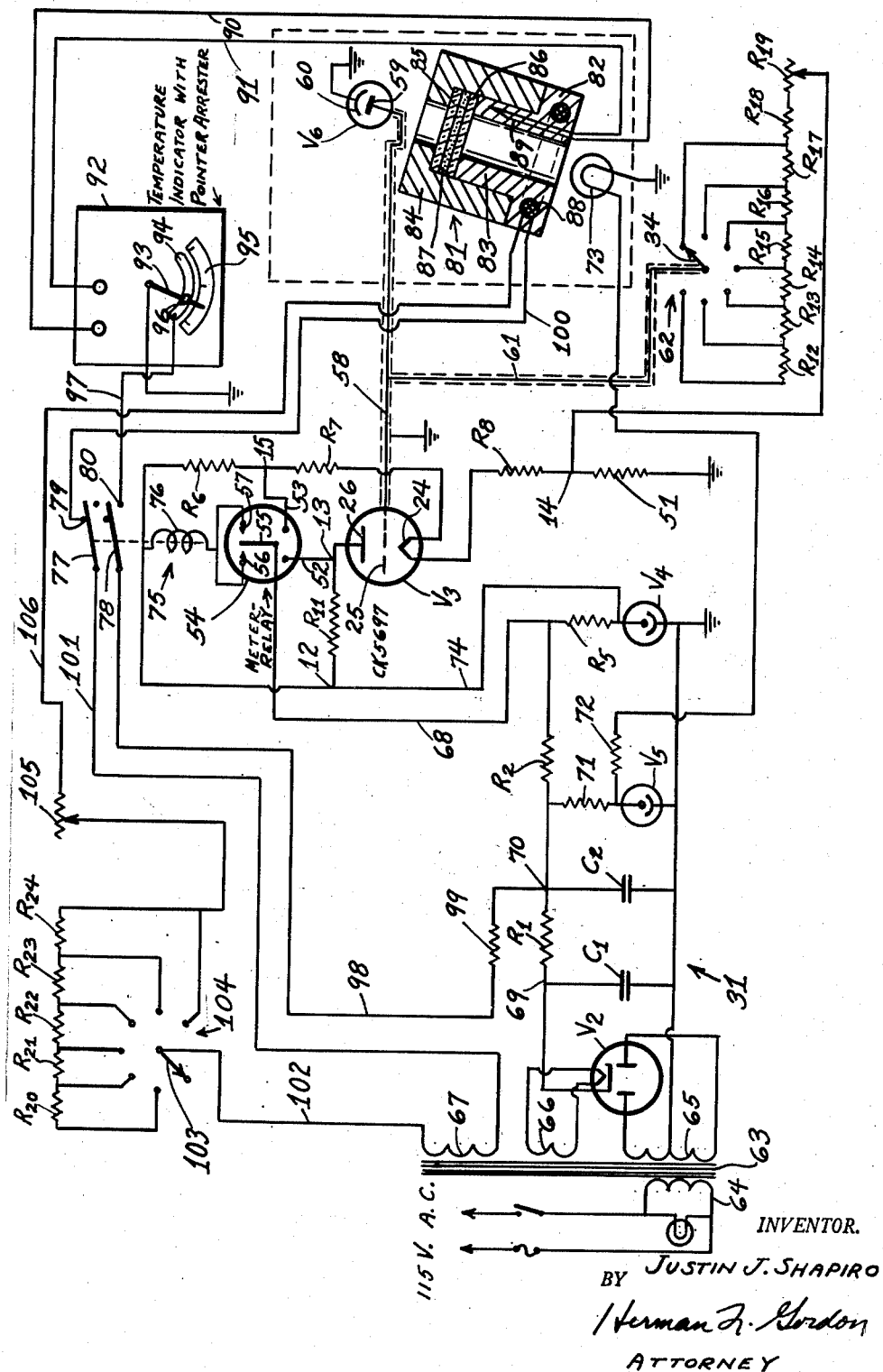
INVENTOR.
BY JUSTIN J. SHAPIRO
Herman F. Gordon
ATTORNEY Patented Feb. 23, 1954

2,669,863

UNITED STATES PATENT OFFICE 2,669,863

APPARATUS FOR MEASURING THE MELTING POINT OF FUSIBLE MATERIALS

Justin J. Shapiro, Hyattsville, Md., assignor to American Instrument Company, Inc., Silver Spring, Md.

Application July 11, 1951, Serial No. 236,167

12 Claims. (Cl. 73—17)

This invention relates to testing devices, and more particularly to an automatic device for determining the melting point of fusible material.

A main object of the invention is to provide a novel and improved device for determining the melting point of fusible material, said device being simple in construction, being easy to use, and providing accurate readings.

A further object of the invention is to provide an improved apparatus for determining the melting point of fusible material, said apparatus involving only a few parts, being relatively inexpensive to manufacture, and providing accurately reproducible results.

A still further object of the invention is to provide an improved apparatus for the determination of melting points of fusible materials wherein personal errors are reduced to a minimum, wherein the amount of time required for a melting point determination is greatly reduced as compared to prior methods, and wherein provision is made for readily setting and resetting to fixed magnitudes the variables which affect a melting point determination, i. e., rate of rise of temperature, the amount of melting at which the melting point temperature is to be taken, and the amount or thickness (light transmission) of the sample.

A still further object of the invention is to provide an improved automatic apparatus for determining the melting point of fusible material wherein the time lag between the occurrence of melting and observation of the temperature of the sample is eliminated, wherein the melting point temperature is indicated and retained so that it may be read or recorded at any time after the determination has been made, and wherein the determination may be carried out without the attention of the operator, freeing him for other work.

Further objects and advantages of the invention will become apparent from the following description and claims, and from the accompanying drawing, wherein:

The single figure is a schematic diagram of an improved automatic melting point determining apparatus according to the present invention.

The apparatus of the present invention utilizes as a basis the change in the light transmission or light scattering properties of a fusible material which occurs when fusion or melting of the material takes place. This change is particularly large if the sample of the material employed is in powdered form. The light transmission characteristics of the material are altered at melting or fusion thereof by coalescence of the material, changes in refractive index thereof, changes in surface tension, and changes in shape of the particles of the material as they progress toward fusion. Although most substances have a high transmission in the liquid phase as compared with the solid phase, materials which are opaque as liquids may transmit substantial quantities of light when in the powdered solid phase, due to penetration of light through interstices between the powder particles.

The present apparatus is arranged to indicate the melting point temperature of a substance regardless of whether the light transmission increases or decreases at the melting point thereof. The present apparatus is also arranged to function with substances which normally show little change in light transmission in passing from the solid continuous phase to the liquid continuous phase, since the substances may be placed in the apparatus in powdered solid form, wherein, as above explained, light may penetrate through the interstices between the powder particles, and the change in transmission occurs when the substance passes to the liquid phase.

The apparatus is arranged to indicate melting point by changes in light transmission resulting from the change in cohesive forces in the substance and the resultant effects of gravity on the sample, particularly where the system is tilted with respect to vertical.

In a typical embodiment of the apparatus of the present invention, the device may comprise the following basic components:

1. A stabilized light source.
2. A melting point block surrounding the melting point sample. The sample is held between two thin glass cover slips. The block contains a heater wire and a thermocouple in juxtaposition with the cover slips, and is formed with aligned apertures to allow light to pass through the block and through the sample. The block may be supported in any suitable manner to minimize heat conduction to its support, and is substantially completely surrounded by air. The block is preferably arranged to maintain as small a temperature differential through it as possible, and to allow thermal equilibrium to be rapidly established between the sample and the block. The apertures are made preferably small to permit as much of the sample as possible to be in thermal contact with the block. The thermocouple is located relatively remote from the heat source and relatively close to the sample, and installed to be in thermal symmetry with the sample, in order to indicate the true temperature of the sample.

(The temperatures at two points at "thermal symmetry" rise and fall together, even though there may be temperature gradients between them.)

3. A heater control rheostat which permits a continuous choice of the rate of rise of temperature of the sample. Said rheostat may be connected in series with the heater, or may take the form of a variable shunt resistor, connected across the heater in any suitable manner to provide means for varying the amount of current flowing through the heater windings. For example, the energization of the heater may be controlled by the employment of a potentiometer to provide a variable potential across the heater winding, or a combination of a potentiometer and a series rheostat may be employed to provide both fine and coarse adjustment of the heater current. Because of the small size of the block, the rate of rise may be set over a wide range, while still maintaining a small differential in temperature between the block and the sample. At the same time, relatively little power is needed to raise the sample to a high temperature. Furthermore, the arrangement of the apparatus is such that the sample temperature will follow the typical temperature rise curve at constant heat input, i. e., rising rapidly from ambient and then approaching some constant temperature at a very low rate of rise, thereby permitting the heater rheostat to be set at a rate-of-rise at melting favoring a very accurate determination, yet without requiring an unreasonable time to reach the melting temperature. The small mass of the block permits this rapid initial rise and ensuing equilibration. Alternatively, (1) the rate of rise control may be set (from a calibration chart) so that the rate of rise at the anticipated melting point temperature will be very low and the apparatus kept undisturbed until the operation is completed, (2) the rate of rise may be set very high so that a quick determination may be made, followed by repeating the determination at a very low rate of rise, for increased accuracy, or, (3) the rate of rise may be set high and a quick determination made, then permitting all the sample to melt by opening the meter-relay contacts, followed by resetting the relay to close at a very small differential and repeating the determination after the sample has cooled (and refrozen) at a very low rate of rise. (This procedure spreads the sample evenly between the cover slips and permits a much more accurate determination.)

4. A phototube or equivalent light-sensitive element which meters the current to a potentiometer in accordance with the intensity of the light received.

5. A potentiometer which enables a variable resistance to be placed in the phototube circuit to regulate the phototube output to supply a constant gain amplifier with just the proper input to balance an associated bridge circuit at the start of the melting point determination.

6. A constant gain amplifier and a bridge circuit which may be similar to the circuit illustrated in my copending patent application, Serial No. 155,237, filed April 11, 1950; the stability and sensitivity of this circuit are such as to permit unbalance of the bridge only upon a change in light intensity at the phototube.

7. A meter and relay in the balance-indicating branch of the bridge, arranged so that the relay contacts are open when the bridge is in balance; the relay contacts are adjustable to close at preset changes from bridge balance. The relay is of the single pole-double throw type, normally open, and closing with bridge unbalance in either direction. The purpose of the individual contact adjustments of the relay is to fix the percentage change in received light on the phototube necessary to operate the relay.

8. A power relay of the double-pole-double-throw type, actuated by the bridge (and meter relay) which performs two functions: (a) to lock a pyrometer (temperature indicator) at an instantaneous indication; (b) to disconnect the heater.

9. A temperature indicator whose movable indicating element can be instantaneously locked (at the temperature at which melting occurs); this pyrometer is locked electrostatically by the application of a high voltage between a metallic disc attached to the movable element and a brass arcuate plate beneath the element extending for the length of travel of the element. An insulating coating is provided on the brass plate to prevent electrical contact with the element (and loss of electrostatic attraction), and a resistor is provided in the circuit to prevent damage to the indicator should the coating wear through and allow electrical contact to be made between the brass plate and the movable indicating element.

The light source is arranged so that light therefrom passes through the melting point block and through the sample, and reaches the phototube. The potentiometer is adjusted until the meter indicates balance. The meter contacts are set to close at a reasonably small change in light intensity on the phototube. For substances containing water, the transmission will change as the water is given off; for such substances, the relay contacts are set further apart, so that this small change in light transmission will not operate the relay. The heater control is set for a suitable rate of rise of temperature.

At the onset of melting, the sample substantially alters the amount of light transmitted through it, and the relays operate to lock the temperature indicator at the instantaneous temperature, which is the melting point temperature. This value may be read immediately or at any later time.

Referring to the drawing, a Wheatstone bridge circuit is illustrated similar to that disclosed in my copending application, Serial No. 155,237, filed April 11, 1950. Said bridge circuit has the four junctions designated respectively at 12, 13, 14 and 15. Junctions 12 and 14 are the input terminals of the bridge. The input terminal 14 is connected to ground through a resistor 51 having a value of the order of 5000 ohms. Terminals 13 and 15 are the output terminals of the bridge. Connected between terminals 13 and 15 by wires 52 and 53 is a meter-relay 54 having the pivoted armature 55 and the respective adjustable stationary contacts 56 and 57 arranged on opposite sides of the armature and adapted to be engaged thereby when a predetermined value of current flows through the winding of the meter-relay in either direction, i. e., when the bridge is unbalanced to a predetermined degree.

Connected between the terminals 12 and 15 is a constant-value resistor $R_6$, and connected between terminals 12 and 13 is another constant-value resistor $R_{11}$.

Designated at $V_3$ is an amplifier tube having a filament 24, a grid 25 and a plate 26. Plate 26 is connected to the bridge junction 13. Connected in series between junctions 15 and 14 are a resistor $R_7$, the filament 24, and the resistor $R_8$.

Designated at $V_6$ is a phototube having one electrode 59 connected by a shielded wire 58 to the grid 25. The other electrode 60 of the phototube is grounded.

Connected to wire 58 by a shielded wire 61 is the rotary pole 34 of a single-pole, multiple-contact switch 62. Designated at $R_{12}$ to $R_{18}$ is a chain of serially connected, relatively high resistors, the first stationary contact of switch 62 being connected to the end terminal of resistor $R_{12}$ and the remaining stationary contacts of said switch being connected to the respective junctions of the resistors $R_{12}$ to $R_{18}$, as shown. Connected in series between the end terminal of resistor $R_{18}$ and bridge terminal 14 is a variable resistor $R_{19}$.

Designated generally at 31 is a constant-voltage D. C. source of generally conventional construction, which includes a power transformer 63 having a primary 64, a high voltage secondary 65, and respective low voltage secondaries 66 and 67. The center tap of secondary 65 is grounded, as shown. The terminals of secondary 65 are connected to the respective plates of a full wave rectifier tube $V_2$. The cathode of tube $V_2$ is connected through a smoothing resistor $R_1$ and a current-limiting resistor $R_2$ to a wire 68, which in turn is connected to the armature 55 of meter-relay 54. The secondary 66 is connected to the filament of tube $V_2$. Connected between the respective terminals 69 and 70 of resistor $R_1$ and ground are the filter condensers $C_1$ and $C_2$. Connected in series between terminal 70 and ground are resistor 71 and voltage regulator tube $V_5$. Connected in series across tube $V_5$ are the resistor 72 and the exciter lamp 73. Connected in series between wire 68 and ground are resistor $R_5$ and voltage regulator tube $V_4$. The bridge terminal 12 is connected by a wire 74 to the junction between resistor $R_5$ and tube $V_4$. It will thus be seen that a constant D. C. potential is applied to bridge terminal 12.

Designated at 75 is a power relay of the double-pole, double-throw type, having the winding 76. The opposing contacts 56 and 57 of the meter-relay 54 are both connected to one terminal of winding 76. The other terminal of said winding is connected to bridge terminal 12, and hence to the positive potential wire 74. It will be seen that when armature 55 engages either contact 56 or 57, the potential drop across resistor $R_5$ is applied to winding 76, causing power relay 75 to become energized.

The relay 75 has the respective armatures 77 and 78. When the relay is deenergized, armature 77 engages an upper contact 79. When the relay becomes energized, armature 78 engages a lower contact 80.

Designated generally at 81 is the melting point block, which may comprise an annular bottom member 82 having a reduced upstanding portion 83 around which is fitted the top member 84 of the block. Disposed between the annular top wall of member 84 and the top rim of portion 83 are the thin transparent glass discs 85 and 86, and between discs 85 and 86 is the sample 87 of the material whose melting point is to be determined. The exciter lamp 73 is located below the bottom end of the central bore of block 81, and the phototube $V_6$ is located above the top end of said bore in a position to receive light from lamp 73 passing through the bore and through the sample 87 on the photo-emissive electrode thereof.

The block 81 is mounted on any suitable support having low heat conductivity and is preferably tilted with respect to the vertical, as shown. The exciter lamp 73 and the phototube $V_6$ are mounted on suitable supports in axial alignment with the bore of block 81, as shown.

These elements (block 81, lamp 73, and phototube $V_6$) are of course mounted in a suitable enclosure, shown diagrammatically in dotted view, which excludes daylight and permits the system to operate without disturbance from external light sources.

The lower portion of bottom member 82 contains a heater winding 88. Member 82 also contains a thermocouple 89 extending upwardly therein and having its junction located adjacent the top rim of portion 83, i. e., relatively close to the sample 87 and in thermal symmetry with said sample. The thermocouple 89 is connected by wires 90 and 91 to the terminals of a conventional temperature indicator 92 of the type equipped with electrostatic means for locking its pointer 93. Said means may comprise a stationary arcuate brass plate 94 disposed beneath the pointer 93 adjacent to the margin of the arcuate indicator scale 95, and a metal disc 96 secured to the pointer over the plate 94, said plate being covered by a coating of insulation to prevent electrical contact between the plate and the overlying, closely adjacent metal disc 96. The pointer will be locked relative to scale 95 by electrostatic attraction when a high D. C. potential is applied across said plate and disc.

Pointer 93 and disc 96 are grounded, as shown. Plate 94 is connected by a wire 97 to lower contact 80 of power relay 75. Armature 78 of said relay is connected by a wire 98 through a resistor 99 to the terminal 70 of resistor $R_1$, whereby high positive D. C. potential is applied to plate 94 when relay 75 is energized.

One terminal of heater winding 88 is connected by a wire 100 to the upper contact 79 of relay 75. Armature 77 is connected by a wire 101 to one terminal of the low voltage secondary 67. The other terminal of secondary 67 is connected by a wire 102 to the pole 103 of a multiple-contact switch 104. Connected between adjacent contacts of switch 104, as shown, are the resistors $R_{20}$ to $R_{24}$. The end terminal of $R_{24}$ is connected through a rheostat 105 and a wire 106 to the remaining terminal of heater winding 88. It will be seen that said heater winding will be energized when switch pole 103 is engaged with one of the active contacts of switch 104, with relay 75 deenergized. When relay 75 is energized, the heater circuit is opened at contact 79.

Switch 104 and rheostat 105 provide a means of regulating the rate of temperature rise of block 81, as above described, so that, if desired, a rapid rate of temperature rise may be obtained until the melting point of the sample 87 is approached, after which the rate of temperature rise may be reduced to a relatively small value.

Switch 62 and rheostat $R_{19}$ are employed to provide balance of the bridge circuit at the beginning of a run.

The adjustable contacts 56 and 57 provide a means of predetermining the amount of unbalance of the bridge required to energize the power relay 75.

At the beginning of a test run, the switch 62 and rheostat $R_{19}$ are adjusted to balance the bridge, thus establishing an initial value of the effective resistance between terminals 13 and 14 of the bridge circuit. When the light transmission through the sample 87 changes, as when the melting point thereof is reached, the phototube $V_6$ responds, to change the bias on grid 25 of tube $V_3$, and hence to change the effective resistance of the bridge arm 13—14, causing the bridge to become unbalanced. Current therefore flows between terminals 13 and 15 of the bridge, through the winding of the meter-relay 54. Upon sufficient unbalance, the armature 55 engages contact 56 or 57, causing power relay 75 to become energized. Armature 78 engages contact 80 and causes high D. C. potential to be applied between disc 96 and plate 94, locking the temperature indicating pointer relative to scale 95. At the same time, armature 77 disengages from contact 79, opening the heater circuit. The pointer 93 then indicates the melting point temperature on scale 95.

It will be noted that the heater is automatically deenergized when the melting point of the sample is reached, insuring that further energization of the heater will not take place subsequent to this point.

In a typical embodiment of the circuit illustrated in the Figure, the following circuit values were employed:

| | |
|---|---|
| Resistor $R_1$ | 1000 ohms. |
| Resistor $R_2$ | 2000 ohms. |
| Resistor 71 | 2000 ohms. |
| Resistor 72 | 500 ohms. |
| Resistor 99 | 1 megohm. |
| Resistor $R_5$ | 3000 ohms. |
| Resistor 51 | 5000 ohms. |
| Resistor $R_8$ | 68 ohms. |
| Resistor $R_7$ | 600 ohms. |
| Resistors $R_{12}$ to $R_{18}$ | 10 megohms each. |
| Rheostat $R_{19}$ | zero to 10 megohms. |
| Resistor $R_6$ | 100 ohms. |
| Resistor $R_{11}$ | 22,000 ohms. |
| Resistors $R_{20}$ to $R_{24}$ | 2 ohms each. |
| Rheostat 105 | zero to 2 ohms. |
| Heater Winding 88 | 1.2 ohms. |
| Condensers $C_1$, $C_2$ | 8 mfd. each. |
| Tube $V_3$ | Type CK5697. |
| Tube $V_2$ | Type 5Z4. |
| Tube $V_5$ | Type VR 150. |
| Tube $V_4$ | Type VR 105. |
| Transformer 63: | |
| Primary 64 | 115 volts. |
| Secondary 65 | 325–0–325 volts. |
| Secondary 66 | 5 volts, 3 amp. |
| Secondary 67 | 6 volts, 5 amp. |

While a specific embodiment of a melting point measuring apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An apparatus for determining the melting point of a sample of fusible material comprising a block member formed with a passage therethrough, transparent sample-retaining means in said block member extending across said passage, a heater in heat-transmitting relation to said block member, a temperature-responsive element in said block member, a light source adjacent said passage at one end of the block member, a light-responsive element adjacent the other end of said passage, a temperature indicator connected to said temperature-responsive element, said indicator having a movable indicating element, means on said indicator for locking said movable element, circuit means operatively connected to said locking means and controlled by said light-responsive element, and means whereby said circuit means actuates said locking means when a substantial change occurs in the transmission of light from the light source to the light-responsive element through the sample-retaining means, whereby the melting temperature of a sample of fusible material in the sample-retaining means may be determined.

2. An apparatus for determining the melting point of a sample of fusible material comprising a block member formed with a passage therethrough, transparent sample-retaining means in said block member extending across said passage, a heater in heat-transmitting relation to said block member, a temperature-responsive element in said block member, a light source adjacent said passage at one end of the block member, a light-responsive element adjacent the other end of said passage, a temperature indicator connected to said temperature-responsive element, said indicator having a movable indicating element, means on said indicator for locking said movable element, an energizing circuit connected to said heater, switch means in said energizing circuit, circuit means operatively connected to said locking means and switch means and controlled by said light-responsive element, and means whereby said circuit means actuates said locking means and opens said switch means when a substantial change occurs in the transmission of light from the light source to the light-responsive element through the sample-retaining means, whereby the melting temperature of a sample of fusible material in the sample-retaining means may be determined.

3. An apparatus for determining the melting point of a sample of fusible material comprising a block member formed with a passage therethrough, transparent sample-retaining means in said block member extending across said passage, a heater in heat-transmitting relation to said block member, a temperature-responsive element in said block member, a light source substantially aligned with said passage on one side of the sample-retaining means, a light-responsive element substantially aligned with the passage at the other side of the sample-retaining means, a temperature indicator connected to said temperature-responsive element, said indicator having a movable indicating element, means on said indicator for locking said movable element, circuit means operatively connected to said locking means and controlled by said light-responsive element, and means whereby said circuit means actuates said locking means when a substantial change occurs in the transmission of light from the light source to the light-responsive element through the sample-retaining means, whereby the melting temperature of a sample of fusible material in the sample-retaining means may be determined.

4. In an apparatus of the character described, a main body of heat-conducting material, transparent sample-retaining means secured to said main body, a heater in heat-transmitting relation to said main body, a light source on one side of said sample-retaining means, a light-sensitive element on the other side of said sample-retaining means arranged to receive light from the light source through the sample-retaining means, a temperature-responsive element disposed in heat-receiving relation to said sample-retaining means, a temperature indicator connected to said temperature-responsive element, said indicator having a movable indicating element and means for locking said movable element, a locking circuit connected to said light-sensitive element, and means whereby said locking circuit controls said locking means, said locking circuit being formed and arranged to actuate said locking means responsive to a substantial change in the transmission of light from the light source to the light-sensitive element through the sample-retaining means, whereby the melting temperature of a sample of fusible material in the sample-retaining means may be determined.

5. In an apparatus of the character described, a main body of heat-conducting material, transparent sample-retaining means secured to said main body and arranged to receive heat therefrom, a heater in heat-transmitting relation to said main body, an energizing circuit connected to said heater, a light source on one side of said sample-retaining means, a light-sensitive element on the other side of said sample-retaining means arranged to receive light from the light source through the sample-retaining means, a temperature-responsive element disposed in heat-receiving relation to said sample-retaining means, a temperature indicator connected to said temperature-responsive element, said indicator having a movable indicating element and means for locking said movable element, and means whereby said light-sensitive element simultaneously actuates said locking means and opens said energizing circuit responsive to a substantial change in the transmission of light from the light source to the light-sensitive element through the sample-retaining means, whereby the melting temperature of a sample of fusible material in the sample-retaining means may be determined.

6. In an apparatus of the character described, a main body of heat-conducting material, transparent sample-retaining means secured to said main body and arranged to receive heat therefrom, a heater in heat-transmitting relation to said main body, an energizing circuit connected to said heater, a light source on one side of said sample-retaining means, a light-sensitive element on the other side of said sample-retaining means arranged to receive light from the light source through the sample-retaining means, a temperature-responsive element disposed in heat-receiving relation to said sample-retaining means, a temperature indicator connected to said temperature-responsive element, said indicator having a movable pointer and means for locking said pointer, circuit means connecting said light-sensitive element and locking means, and means whereby said circuit means simultaneously actuates said locking means and opens said energizing circuit responsive to the transmission of a predetermined amount of light from the light source through the sample-retaining means to the light-sensitive element whereby the melting temperature of a sample of fusible material in the sample-retaining means may be determined.

7. In an apparatus of the character described, a heat-conducting support, means for heating the support, transparent sample-retaining means mounted on the support, a light source on one side of the sample-retaining means, temperature-responsive means mounted in heat-receiving relation to the sample-retaining means, a temperature indicator connected to said temperature-responsive means, said indicator having a movable indicating element, light-responsive means on the other side of the sample-retaining means operating in response to a substantial change in light transmission through the sample-retaining means, whereby the temperature at the melting point of a sample of fusible material in said sample-retaining means may be determined, means controllingly connecting said light-responsive means to said temperature indicator, and means for locking the movable element responsive to a substantial change in light transmission through the sample-retaining means.

8. In an apparatus of the character described, a heat-conducting support, means for heating the support, transparent sample-retaining means mounted on the support, a light source on one side of the sample-retaining means, temperature-responsive means mounted in heat-receiving relation to the sample-retaining means, a temperature indicator connected to said temperature-responsive means, said indicator having a movable indicating element, light-responsive means on the other side of the sample-retaining means operating in response to a substantial change in light transmission through the sample-retaining means, whereby the temperature at the melting point of a sample of fusible material in said sample-retaining means may be determined, means controllingly connecting said light-responsive means to said temperature indicator and heating means, and means for simultaneously locking the movable element and de-energizing said heating means responsive to a substantial change in light transmission through the sample-retaining means.

9. The structure of claim 7, and wherein the sample-retaining means comprises a pair of spaced parallel transparent plates tilted relative to the horizontal.

10. The structure of claim 7, and wherein said support comprises an annular body of heat-conducting material, the sample-retaining means being disposed across the bore of said body.

11. The structure of claim 10, and wherein said bore is tilted relative to vertical and the sample-retaining means comprises a pair of spaced parallel transparent plates mounted normal to the axis of the bore.

12. The structure of claim 7, and wherein the heating means comprises a resistance winding contained in the support relatively remote from the sample-retaining means.

JUSTIN J. SHAPIRO.

References Cited in the file of this patent

UNITED STATES PATENTS

| Number | Name | Date |
|---|---|---|
| 1,609,129 | Roberts | Nov. 30, 1926 |
| 1,937,206 | Riepert | Nov. 28, 1933 |
| 2,440,472 | Horner et al. | Apr. 27, 1948 |

FOREIGN PATENTS

| Number | Country | Date |
|---|---|---|
| 141,461 | Austria | Apr. 25, 1935 |